United States Patent [19]

Kimoto et al.

[11] Patent Number: 5,034,945
[45] Date of Patent: Jul. 23, 1991

[54] PACKET SWITCHING NETWORK WITH ALTERNATE TRUNKING FUNCTION TO REPEAT AVOIDING LOOPED TRUNK

[75] Inventors: Atsushi Kimoto, Hadano; Michio Suzuki, Odawara; Masashi Ikeda, Naka, all of Japan

[73] Assignees: Hitachi, Ltd., Tokyo; Hitachi Software Engineering Co., Ltd., Yokohama, both of Japan

[21] Appl. No.: 382,148

[22] Filed: Jul. 19, 1989

[30] Foreign Application Priority Data

Jul. 21, 1988 [JP] Japan .................... 63-182722

[51] Int. Cl.$^5$ .................... H04J 3/26; H04L 1/00
[52] U.S. Cl. .................... 370/13.1; 370/014
[58] Field of Search .................... 370/13.1, 14, 60.1, 370/94.1; 371/20.2

[56] References Cited

U.S. PATENT DOCUMENTS

| 4,849,968 | 7/1989 | Turner | 370/60 |
| 4,894,823 | 1/1990 | Adelmann et al. | 370/60 |
| 4,920,529 | 4/1990 | Sasaki et al. | 370/60 |

OTHER PUBLICATIONS

Yagi et al., "Computer Network", Asakura Shoten, Jun 15, 1983, pp. 21-24.

Primary Examiner—Douglas W. Olms
Assistant Examiner—Melvin Marcelo
Attorney, Agent, or Firm—Pennie & Edmonds

[57] ABSTRACT

A switching network having a plurality of repeater nodes, wherein each repeater node checks the number of times data packet has been received. If in excess of predetermined number, the repeater node transmits a looped trunk detection packet, the looped trunk detection packet being arranged to be written with the node address of each of the plurality of repeater nodes within a looped trunk as its repeating history. The repeater node checks whether the node address thereof is written in the repeating history or not. If the result is negative, the looped trunk detection packet is repeated and transmitted by writing the node address of the repeater node in the repeating history. If the result is positive, the repeater node does not repeat transmission of the succeeding packets from the repeater node to the route of the looped trunk, and transmits a looped trunk notification packet to repeater nodes. The looped trunk detection notification packet then forbids to repeat transmission of the succeeding packets from each of the other repeater nodes to the route of the looped trunk.

10 Claims, 5 Drawing Sheets

FIG. 4(a)

| 101 | 102 | 103 | 104 |
|---|---|---|---|
| A | B | d | |
|   | C | c | |
| B | B | d | |
|   | C | c | |
| C | C | c | |
|   | B | d | |
| E | B | d | |
|   | C | c | |
| F | B | d | × |
|   | C | c | × |

ROUTING TABLE AT NODE D

FIG. 4(b)

| 101 | 102 | 103 | 104 |
|---|---|---|---|
| A | A | a | |
|   | C | b | |
| C | D | d | |
|   | E | e | |
| D | D | d | |
|   | C | b | |
|   | E | e | |
| E | E | e | |
|   | C | b | |
|   | D | d | |
| F | C | b | × |
|   | D | d | × |
|   | E | e | |

ROUTING TABLE AT NODE B

PACKET SWITCHING NETWORK WITH ALTERNATE TRUNKING FUNCTION TO REPEAT AVOIDING LOOPED TRUNK

BACKGROUND OF THE INVENTION

The present invention relates to route selection control for a packet switching network, and more particularly to a packet switching network having a function to repeat avoiding a looped trunk caused by network failure or the like.

As a system for repeating a packet in a packet switching network, there are known a fixed alternate trunking system and an adaptive alternate trunking system. According to the former system, a route to a destination of a packet is determined beforehand at each repeater node. According to the latter system, a route to a destination is determined in accordance with network traffics and failure conditions. If a failure occurs in the fixed alternate trunking system, the repeater nodes connected to the failure site change their trunking route in accordance with a predetermined rule. Therefore, if the scale of a packet switching network is large, there may occur a looped trunk in the network along which a packet is continuously transmitted. In such a case, the packet once entered into the looped trunk cannot escape therefrom to thereby disable packet communication.

As a measure for dealing with a looped trunk generated in a packet switching network, there have been known, as described in, e.g., "Computer Network" edited and written by Yagi et al., published by Asakura Shoten on June 15, 1983, at page 24, a method of discarding a packet if the number of repeating times of the packet exceeds a predetermined number, and a method of discarding a packet if it stays within the network longer than a predefined time.

The above-described prior art does not pay regard to repeating the packets, which enter into a looped trunk, avoiding the looped trunk after the looped trunk was brought about. The succeeding packets are discarded under the condition that the number of repeating times or the stay time exceeds a certain value, posing a problem of disability of packet communication.

SUMMARY OF THE INVENTION

It is an object of the present invention to provide a packet switching network having a function to repeat avoiding a looped trunk partially generated within a packet switching network.

In the packet switching network according to this invention, each repeater node checks, based on the record contents of a received data packet, whether or not the number of repeating times stored in the packet exceeds a predetermined number or whether or not the stay time of the packet within the network exceeds a predetermined time. Upon detection of an excessive number or excessive time, the repeater node transmits a looped trunk detection packet which has a repeating history node address field for storing therein addresses of the nodes repeating this packet within the looped trunk. The destination or terminating node address in the looped trunk detection packet is the same terminating node address of the packet which caused the excessive number of repeating times and excessive stay time. Upon receipt of the looped trunk detection packet, each repeater node checks if its own node address is recorded in the repeating history node address field of the packet. If not, the repeater node transmits the packet to the route predetermined for the node in accordance with the fixed alternative trunking system. If its own address is recorded, it is regarded that a looped trunk has occurred. Then, this repeater node operates such that the other repeater nodes as well as this repeater node constituting the looped packet and storing their addresses in the repeating history node address field of the packet, are caused to inhibit the transmission, to the looped trunk, of the succeeding data packets having the same destination node address as that in the looped trunk detection packet.

The succeeding data packets having the same destination node address are therefore transmitted to an alternative route by avoiding the looped trunk, thus allowing to transmit data packet to the destination node. In addition, the above-described looped trunk detection operation is intercepted for a predetermined time after a looped trunk is once detected. Therefore, an increase of traffics to be caused by the detection operation can be suppressed.

Data processing associated with determining the contents of a received data packet and forming a looped trunk detection packet and looped trunk notification packet is executed by using a data processing unit provided at each repeater node. An alternative trunking route is selected by using a routing table in a memory provided at each repeater node.

According to the present invention, even if a looped trunk occurs due to trunk line failure or the like, packet communication can be continued by repeating avoiding the looped trunk. In addition, the looped trunk detection operation is intercepted for a predetermined time after a looped trunk is once detected, thereby suppressing an increase of traffics.

BRIEF DESCRIPTION OF THE DRAWINGS

These and other objects and advantages of the present invention will become apparent by reference to the following description and accompanying drawings, wherein;

FIGS. 4(a) and 4(b), are diagrams showing examples of routing tables stored in repeater nodes.

DESCRIPTION OF THE PREFERRED EMBODIMENTS

The preferred embodiments of the present invention will be described with reference to the accompanying drawings.

Figure 1:
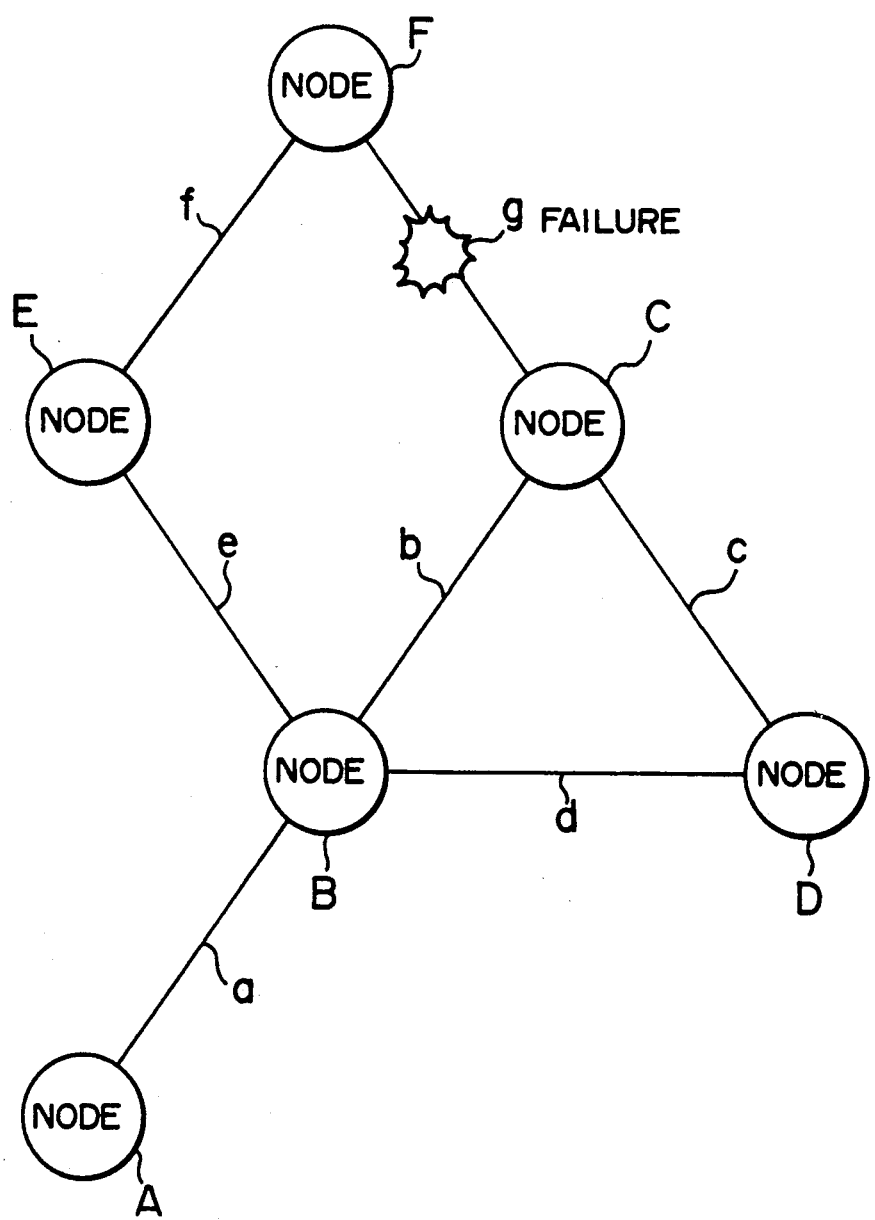
FIG. 1 is a schematic diagram showing an example of the packet switching network according to the present invention.

FIG. 1 shows an example of the packet switching network according to the present invention. In FIG. 1, A, B, C, D, E, and F represent a repeater node, and a, b, c, d, e, f, and g represent a trunk line. It is assumed that the trunk line g is now under trouble.

Figure 2:
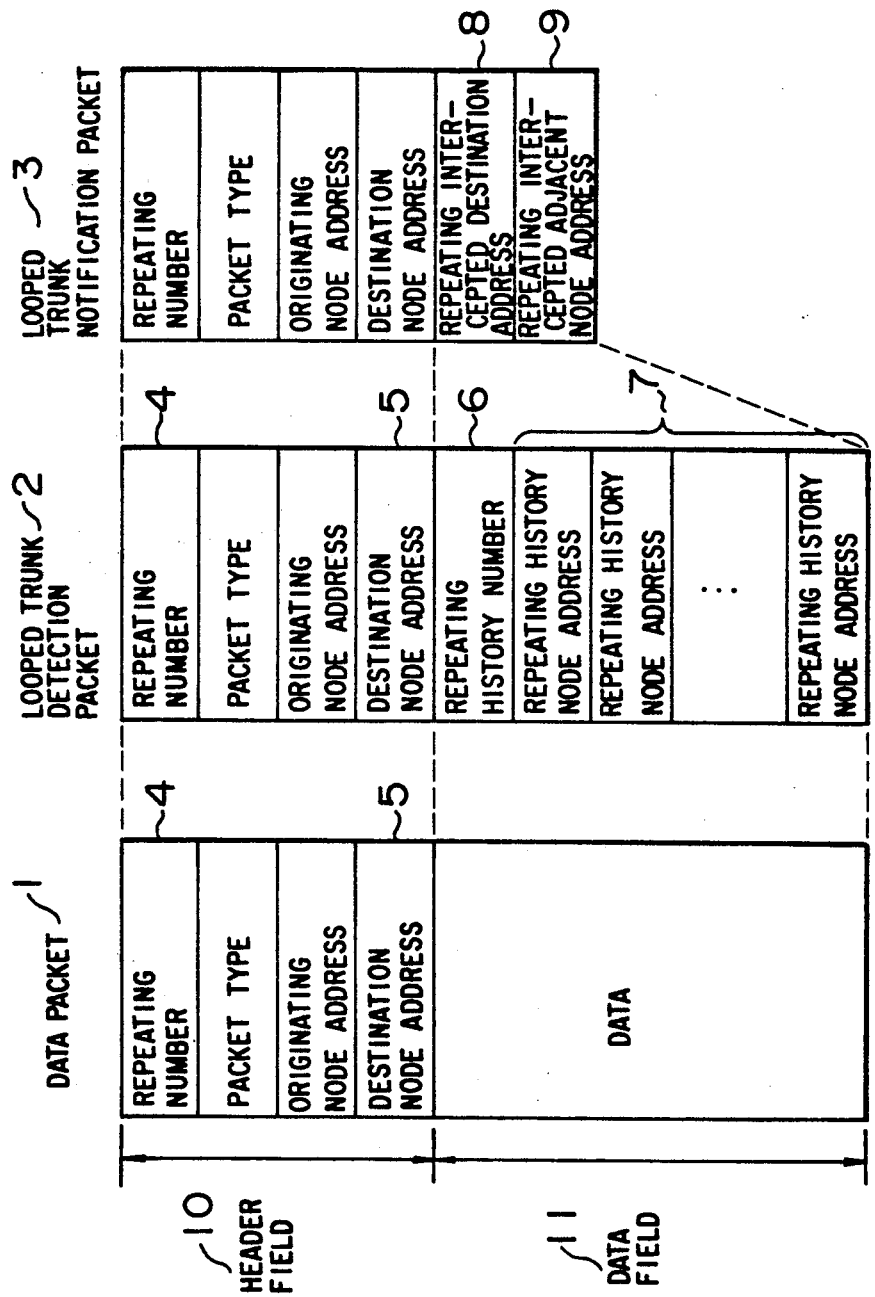
FIG. 2 shows examples of the formats of a data packet, looped trunk detection packet and looped trunk notification packets used with the packet switching network of this invention, wherein abnormal communication is detected when the number of repeating times of a data packet exceeds a predetermined number.

FIG. 2 shows examples of the formats of packets of this invention. Reference numeral 1 represents a data packet, 2 a looped trunk detection packet, and 3 a looped trunk notification packet. The format of a header field 10 of each packet is the same, whereas the format of a data field 11 of each packet is different. The number of repeating times of a data packet is written in a repeating number field of the header field 10, the type of data packet, looped trunk detection packet or looped trunk notification packet is written in a packet type field, an address of a node from which a packet was transmitted, is written in an originating node address field, and an address of a node to which a packet is terminated, is written in a terminating node address field.

It is assumed now that node A transmits a data packet 1 to node F. In this case, since the trunk line g is under trouble, the data packet 1 is trandmitted to a route starting from node A, to node B, node C, node D and to node B. The data packet 1 thus circulates within the looped trunk composed of node B, node C, and node D. While the data packet 1 circulates within the loop, the number of repeating times of the data packet exceeds a limit value at a certain node within the loop.

Assuming that an excessive repeating number is detected at node D, it generates a looped trunk detection packet 2 having the destination node address, i.e., node F address, same as that in the field 5 in the data packet 1. This looped trunk detection packet 2 is transmitted to the trunk lines c and d. Data processing associated with detecting the excessive repeating number and forming a looped trunk detection packet is carried out by a data processing unit provided at each repeater node. The node which forms the looped trunk detection packet 2 sets 1 in a repeating history number field 6 in its data field 11, and sets its own node address in a repeating history node address field 7 at the head position thereof. Each node receiving the looped trunk detection packet 2 refers to the repeating history node addresses 7 equal in number to the repeating history number 6 in the data field 11. If its own node address is not included therein, the repeating history number 6 is incremented by 1, and its own node address is added to the repeating history node address field 7 to transmit the resultant looped trunk detection packet to the next adjacent node.

When the looped trunk detection packet 2 first transmitted to the trunk line d from node D returns again to node D after it was repeated via the route starting from node D to node B, node C and to node D, the addresses of nodes D, B and C have been written in the repeating history node address field 7. From the node D address written in the repeating history node address field 7, node D can therefore detect that the looped trunk detection packet for the destination node F is now within the looped trunk. It is further detected from the contents of the node address field 7 that the looped trunk is constructed of a route starting from node D to node B, node C and to node D. In order to prevent consecutive generation of a looped trunk detection packet 2 for the same destination node, for a predetermined time after a node transmits or repeats the looped trunk detection packet 2, it does not transmit a new looped trunk detection packet even if the number of repeating times of the new looped trunk detection packet exceeds a predetermined value.

Node D which detected an occurrence of the looped trunk renews the contents of a routing table in its memory so that the packet destined to node F is inhibited to be transmitted or repeated from node D. At the same time, node D transmits a looped trunk notification packet 3 to nodes B and C which are the nodes other than node D on the looped trunk. The address which is the same as the destination address 5 in the looped trunk detection packet 2 is written in a repeating intercepted destination address field 8 in the looped trunk notification packet 3, whereas the address of the adjacent node next to node D to which a data packet is transmitted is written in a repeating intercepted adjacent node address field 9. Consequently, each node intercepts to transmit or repeat a data packet destined to the repeating intercepted destination address 8, to the adjacent node indicated by the repeating intercepted adjacent node address 9. Specifically, node B intercepts to repeat the data packet destined to node F to the route toward node C, and node C intercepts to repeat the data packet to the route toward node D.

Similarly, the data packet is intercepted to be repeated toward the routes opposite in direction to the above-described routes, based on the looped trunk detection packet 2 transmitted to the trunk line c from node D.

In this condition, when node A transmits a data packet 1 destined to node F, node B directs the data packet to the route toward node E because the routes toward nodes C and D are inhibited. Accordingly, the data packet reaches the destination node F via node E. Since node B inhibits the routes toward nodes C and D only with respect to the data packet destined to node F, if node A transmits a data packet destined to node C, then node B permits to repeat the data packet toward the route to node C. Releasing the repeating interception is effected after a predetermined time lapse at each node.

Similar processings such as repeating interception is also carried out for the case where another repeater node different from a repeater node which transmitted a looped trunk detection packet detects an occurrence of a looped trunk.

Figure 3:
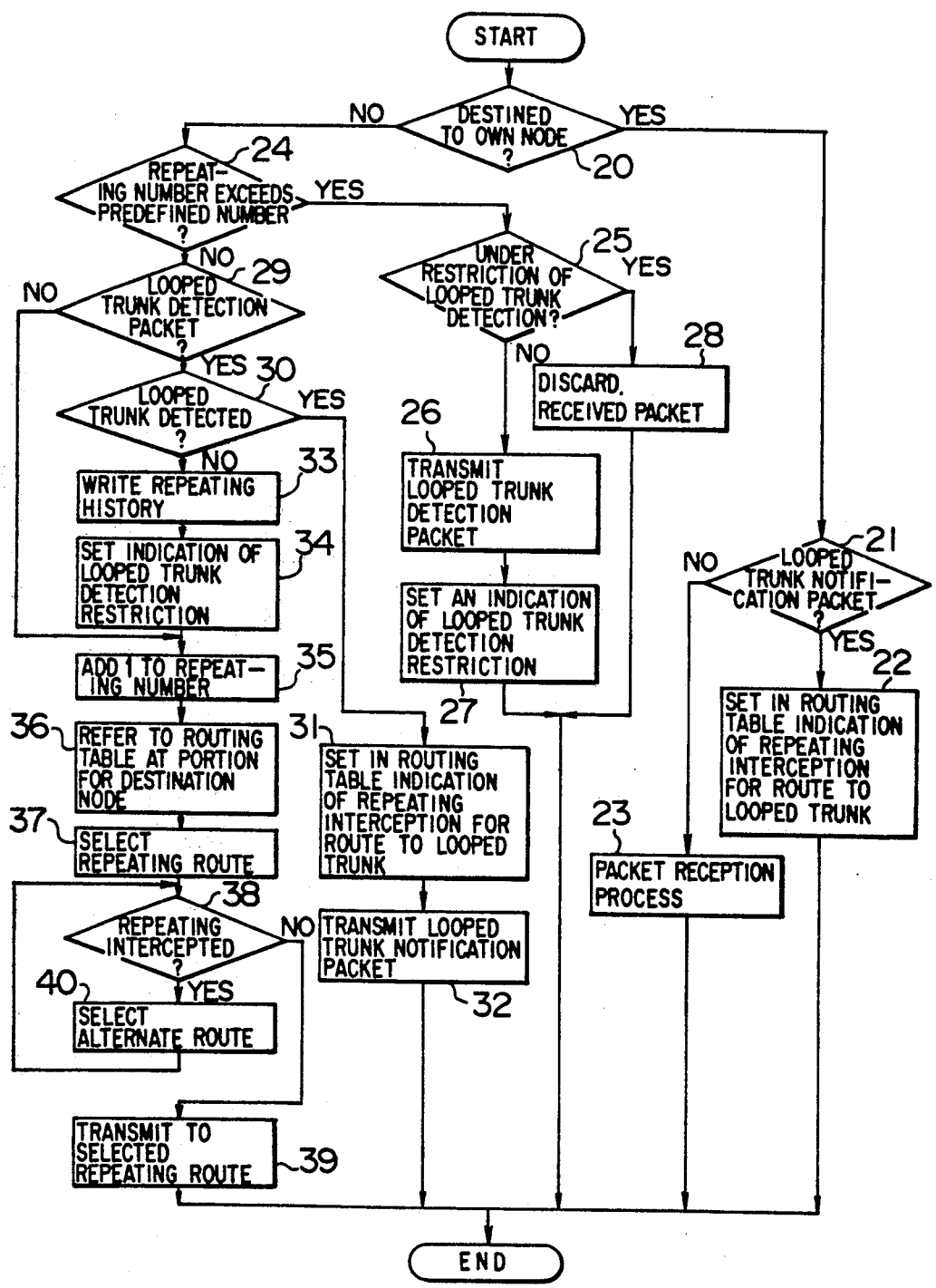
FIG. 3 is a flow chart illustrating processings at a repeater node upon reception of a packet.

FIG. 3 is a flow chart illustrating packet reception processing by a repeater node. FIG. 4 shows an example of the formats of routing tables provided at repeater nodes B and D after detecting an occurrence of a looped trunk, wherein reference numeral 101 represents a destination node column, 102 a repeating transfer node column, 103 a repeating transfer trunk line column, and 104 a repeating interception indication column. A symbol "x" in the column 104 means interception or inhibition of repeating.

If a received packet at a node is destined to itself (step 20) and is a looped trunk notification packet (step 21), then a repeating interception indication on the routing table is set for the routes toward the repeating intercepted adjacent nodes for the designated destination node (step 22). If a received packet at a node destined to itself is other than the looped trunk nofitication packet, a packet reception processing is executed (step 23).

If a received packet at a node is destined to other nodes, it is checked whether or not the number of repeating times exceeds a predefined value (step 24). If the number is in excess of the predefined value, it is checked if the looped trunk detection operation for the destination node is now restricted or not (step 25). If not, a looped trunk detection packet is transmitted toward the route same as that to the destination node indicated by the received packet (step 26), and a looped trunk detection restriction is enabled (step 27). If the looped trunk detection restriction is already effected (step 25), the received packet is discarded (step 28).

If the number of repeating times does not exceed the predefined value (step 24), it is checked if the received packet is a looped trunk detection packet or not (step 29). If not, the number of repeating times is incremented by 1 without performing a process of detecting an occurrence of a looped trunk (step 35), and the routing table is referred to at the portion corresponding to the terminating node, in accordance with the destination node address (step 36), to thereby select a route to the terminated node (step 37). It is checked if the route to be selected is given a repeating interception indication (step 38). If not, the received packet is transmitted toward the selected route (step 39). Alternatively, if the route to be selected is given a repeating interception indication, an alternative route in the routing table is selected (step 40) and it is again confirmed whether or not the alternative route is not given a repeating interception indicating to thereafter transmit the received packet.

If the received packet is a looped trunk detection packet (step 29), it is checked if a looped trunk has occurred by checking if the repeating history node address field of the received packet includes its own node address (step 30). If an occurrence of a looped trunk is not detected, the repeating history number is incremented by 1 and its own node address is added to the repeating history node address field (step 33), to thereafter enable a looped trunk detection restriction with respect to the packet destined to the terminating node (step 34). Next, the repeating number is incremented by 1 (step 35) and the repeating operations similar to the case of repeating a packet other than the looped trunk detection packet are performed (steps 36 to 40).

If an occurrence of a looped trunk is detected (step 30), a repeating interception indication on the routing table is set for the routes toward the repeating intercepted adjacent nodes for the designated destination node (step 31), and a looped trunk notification packet is transmitted to the adjacent nodes within the looped trunk (step 32).

Figure 5:
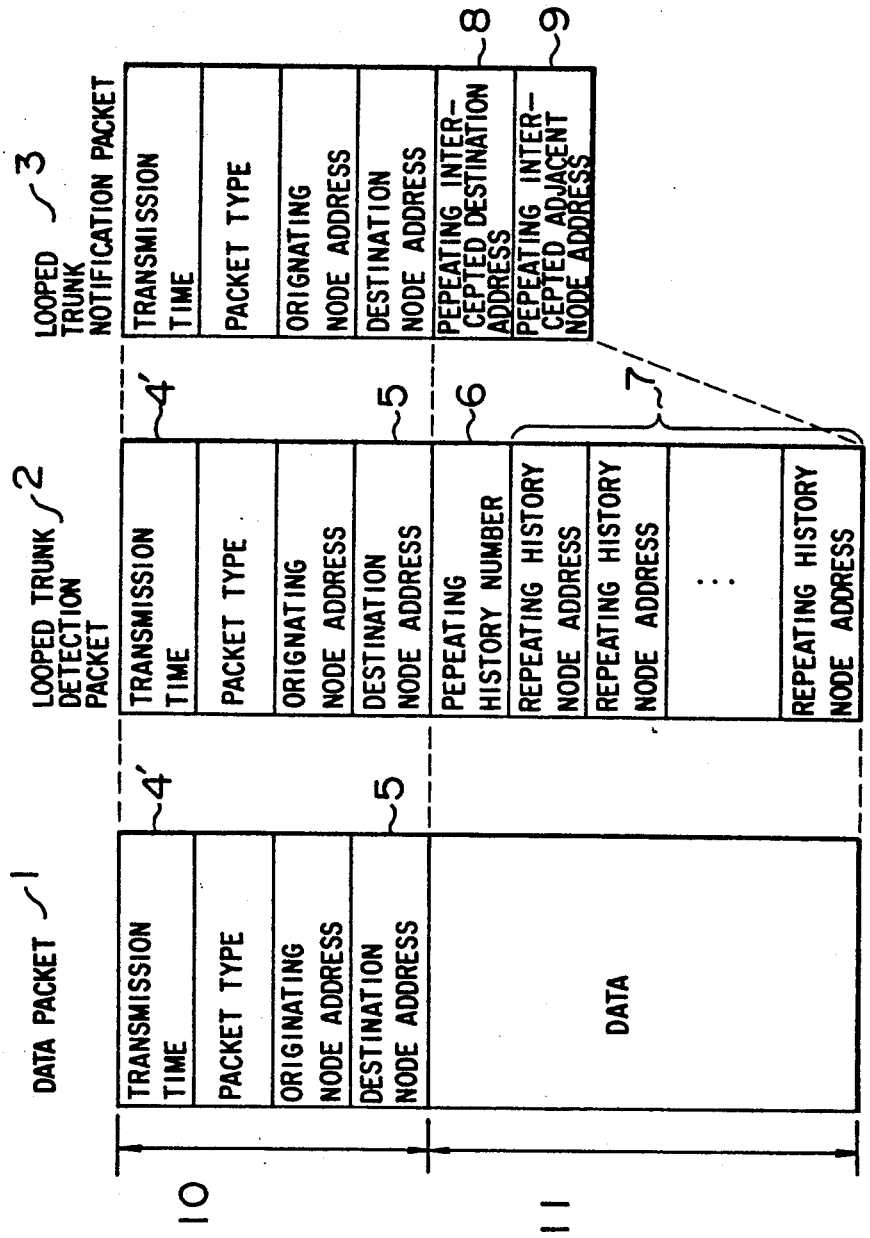
FIG. 5 shows examples of the formats of a data packet, looped trunk detection packet and looped trunk notification packets used with the packet switching network of this invention, wherein abnormal communication is detected when the stay time of a data packet within the network exceeds a predetermined time.

In the above embodiment, an abnormal state of packet communication has been detected based on the fact that the number of repeating times exceeds a predetermined number. Instead of using the number of repeating times, the abnormal state may be detected based on the fact that a stay time of a packet within a packet switching network exceeds a predetermined time. In such a case, an originating node transmits a data packet as shown in FIG. 5 with a transmission time 4' being written in the header field of the data packet in place of the repeating number 4. Upon receipt of such data packet, each repeater node calculates a stay time by subtracting the transmission time from the present time to thereby check if the stay time exceeds the predefined value. A transmission time is also written in the header field of the looped trunk detection packet and looped trunk notification packet in place of the repeating number. In the processings by each repeater node, at step 24 shown in FIG. 3, instead of an excessive repeating number, an excessive stay time is checked. The remaining operations are the same as the processes shown in FIG. 3 except that the process of incrementing the repeating number by 1 at step 35, so the flow chart for this embodiment is omitted.

In the above-described embodiments, it is assumed that a looped trunk has occurred due to trunk line failure. A looped trunk may also occur due to repeater node itself. The present invention is obviously applicable also to the latter case.

We claim:

1. A packet switching network having a plurality of repeater nodes, each repeater node comprising:

means for receiving and repeating a data packet by incrementing by 1 the number of repeating times stored in said data packet;

means for checking if the number of repeating times of said received data packet to be repeated exceeds a predetermined number and if the number exceeds a predetermined number, transmitting a looped trunk detecting packet while using the destination of said data packet as the destination of said looped trunk detection packet, said looped trunk detection packet being arranged to be written with the node address of each of said plurality of repeater nodes, which repeat said looped trunk detection packet, as its repeating history;

means for checking if the node address of said repeater node is written in said repeating history of said received looped trunk detecting packet, and if the node address is not written therein, repeating and transmitting said received looped trunk detection packet by writing the node address of said repeater node in said repeating history, whereas if the node address is written therein, forbidding to repeat, from said repeater node to the route of a looped trunk, transmission of the succeeding packets having the same destination node address as that in said looped trunk detection packet, and transmitting a looped trunk notification packet to repeater nodes other than said repeater node which repeated said looped trunk detection packet sent from said repeater node, said looped trunk detecting notification packet forbidding to repeat, from each of said other repeater nodes to the route of said looped trunk, transmission of said succeeding packets having the same destination node address as that in said looped trunk detection packet; and means for forbidding to repeat transmission of the succeeding packets in accordance with the contents of said received looped trunk notification packet.

2. A packet switching network according to claim 1, wherein each said repeater node performs data processing of reception/transmission packet by using a data processing unit provided at said repeater node.

3. A packet switching network according to claim 1, wherein each said repeater node is caused to forbid to transmit said looped trunk detection packet for predetermined time after said repeater node has transmitted or repeated said looped trunk detection packet.

4. A packet switching network according to claim 1, wherein each said repeater node includes therein a routing table for determining a trunking route to each packet destination node, a change of trunking route and an inhibition of repeating transmission to each route being effected by changing the contents of said routing table.

5. A packet switching network having a plurality of repeater nodes, each repeater node comprising:

means for writing a transmission time when said repeater node transmits a packet;

means for checking, based on the transmission time written in a received data packet to be repeated, if the stay time of said received data packet within said packet switching network exceeds a predetermined time, and if the stay time exceeds a predetermined time, transmitting a looped trunk detection packet while using the destination of said data packet as the destination of said looped trunk detection packet, said looped trunk detection packet being arranged to be written with the node address of each of said plurality of repeater nodes, which repeat said looped trunk detection packet, as its repeating history;

means for checking if the node address of said repeater node is written in said repeating history of said received looped trunk detecting packet, and if the node address is not written therein, repeating and transmitting said received looped trunk detection packet by writing the node address of said repeater node in said repeating history, whereas if the node address is written therein, forbidding to repeat, from said repeater node to the route of a looped trunk, transmission of the succeeding packets having the same destination node address as that in said looped trunk detection packet, and transmitting a looped trunk notification packet to repeater nodes other than said repeater node which repeater nodes repeated said looped trunk detection packet sent from said repeater node, said looped trunk detecting notification packet forbidding to repeat, from each of said other repeater nodes to the route of said looped trunk, transmission of said succeeding packets having the same destination node address as that in said looped trunk detection packet; and means for forbidding to repeat transmission of the succeeding packets in accordance with the contents of said received looped trunk notification packet.

6. A packet switching network according to claim 5, wherein each said repeater node performs data processing of reception/transmission packet by using a data processing unit providing at said repeater node.

7. A packet switching network according to claim 5, wherein each said repeater node is caused to forbid to transmit said looped trunk detection packet for predetermined time after said repeater node has transmitted or repeated said looped trunk detection packet.

8. A packet switching network according to claim 5, wherein each said repeater node includes therein a routing table for determining a trunking route to each packet destination node, a change of trunking route and an interception of repeating to each route being effected by changing the contents of said routing table.

9. A method of bypassing a looped trunk in a packet switching network having a plurality of repeater nodes, upon detection of said looped trunk when the number of repeating times of a data packet exceeds a predetermined number at one of said plurality of repeater nodes, comprising:

a step of transmitting, from a repeater node which detects that the number of repeating times of said data packet exceeds said predetermined number, a looped trunk detection packet while using the destination of said data packet as the destination of said looped trunk detection packet, said looped trunk detection packet being arranged to be written with the node address of each of said plurality of repeater nodes which repeat said looped trunk detection packet;

a step of checking if the node address of said repeater node is written in a repeating history of said received looped trunk detecting packet, and if the node address is not written therein, repeating and transmitting said received looped trunk detection packet by writing the node address of said repeater node in said repeating history, whereas if the node address is written therein it is judged that said looped trunk has been established, forbidding to repeat from said repeater node to the route of a looped trunk, transmission of the succeeding packets having the same destination node address as that in said looped trunk detection packet, and transmitting a looped trunk notification packet to repeater nodes other than said repeater node, which repeater nodes repeated said looped trunk detection packet sent from said repeater node, said looped trunk detection packet forbidding to repeat, from each of said other repeater nodes to the route of said looped trunk, transmission of said succeeding packets having the same destination node address as that in said looped trunk detection packet; and a step of forbidding to repeat, at each repeater node which received said looped trunk notification packet, transmission of the succeeding packets in accordance with the contents of said received looped trunk notification packet.

10. A method of bypassing a looped trunk in a packet switching network having a plurality of repeater nodes, detection of said looped trunk when the stay time of a data packet within said packet switching network exceeds a predetermined number at one of said plurality of repeater nodes, comprising:

a step of transmitting, from a repeater node which detects that the stay time of said data packet within said packet switching network exceeds said predetermined number, a looped trunk detection packet while using the destination of said data packet as the destination of said looped trunk detection packet, said looped trunk detection packet being arranged to be written with the node address of each of said plurality of repeater nodes which repeat said looped trunk detection packet;

a step of checking if the node address of said repeater node is written in a repeating history of said received looped trunk detecting packet, and if the node address is not written therein, repeating and transmitting said received looped trunk detection packet by writing the node address of said repeater node in said repeating history, whereas if the node address is written therein it is judged that said looped trunk has been established, intercepting to repeat, from said repeater node to the route of said looped trunk, the succeeding packets having the same destination node address as that in said looped trunk detection packet, and transmitting a looped trunk notification packet to repeater nodes other than said repeater node, which repeater nodes repeated said looped trunk detection packet sent from said repeater node, said looped trunk detecting notification packet forbidding to repeat, from each of said other repeater nodes to the route of said looped trunk, transmission of said succeeding packets having the same destination node address as that in said looped trunk detection packet; and a step of forbidding to repeat, at each repeater node which received said looped trunk notification packet, transmission of the succeeding packets in accordance with the contents of said received looped trunk notification packet.

* * * * *